INVENTOR:
Chester C. Shaw

Attorneys

United States Patent Office 3,250,979
Patented May 10, 1966

3,250,979
REGULATED POWER SUPPLY FOR
ELECTRIC MOTORS
Chester C. Shaw, Burbank, Calif., assignor to Minnesota
Mining and Manufacturing Company, St. Paul, Minn.,
a corporation of Delaware
Filed May 13, 1959, Ser. No. 813,036
12 Claims. (Cl. 318—395)

This is a continuation-in-part of co-pending application Serial No. 742,520, filed June 17, 1958, now abandoned, by Chester C. Shaw for Regulated Power Supply for Electric Motors.

This invention relates to regulated electric power supplies, and in particular to improved transistorized power supplies for shunt motors.

For operating a shunt motor at a constant speed with a varying load and a constant field current, the armature current must vary directly with the load, and the armature voltage must rise as the current increases to compensate for the increasing voltage drop across the equivalent resistance to the armature. Hence, for automatically maintaining a constant speed, the armature must be connected to a power supply having negative regulation, or an equivalent series resistance that is negative and approximately equal to the equivalent series resistance of the armature, so that the net resistance of the armature circuit loop is essentially zero, and the induced voltage or back E.M.F. in the armature winding is kept constant. A principal object of this invention is to provide improved regulated power supplies having the desired characteristics for operating small shunt motors at constant speed.

In small regulated power supplies, the use of transistors for regulation and control provides obvious advantages, particularly in compactness, efficiency and circuit simplicity. However, in conventional circuits of this type, transistor damage is apt to occur, particularly during start-up and periods of overloading, due to excessive voltages across the transistor or excessive power dissipation within the transistor or both. Another object of this invention is to provide a transistorized control circuit with effective protection of the transistor from excessive voltages and excessive power dissipation.

Other objects and advantages of the invention will become apparent as the description proceeds.

Briefly stated, the motor armature is connected in a series circuit loop with a voltage source and a current-control circuit having a negative resistance of such value that the net series resistance of the circuit loop is essentially zero. Thus the power supply, consisting of the voltage source and the control circuit in series, is equivalent to an ideal constant-voltage source in series with a negative resistance. The novel control circuit comprises two transistors connected back-to-back, i.e., the base electrode of each transistor is connected to the collector electrode of the other. A first one of these two transistors has its emitter and collector electrodes connected in the series circuit loop with the motor armature and voltage source. Also connected in this series loop, between the collector electrode of the first transistor and the voltage source, there is a small series resistor for providing a voltage drop proportional to the armature current. This resistor also constitutes a part of the base-to-emitter circuit of the second one of the two transistors, whereby the currents conducted by the second transistor, and particularly the collector current thereof, vary directly with the armature current. Because the collector electrode of the second transistor is connected to the base electrode of the first transistor, the conductivity of the first transistor likewise varies directly with the armature current, whereby the voltage across the first transistor varies inversely with current and a negative resistance characteristic is provided.

The foregoing and other aspects of this invention may be better understood from the following illustrative description and the accompanying drawings.

Figure 1:
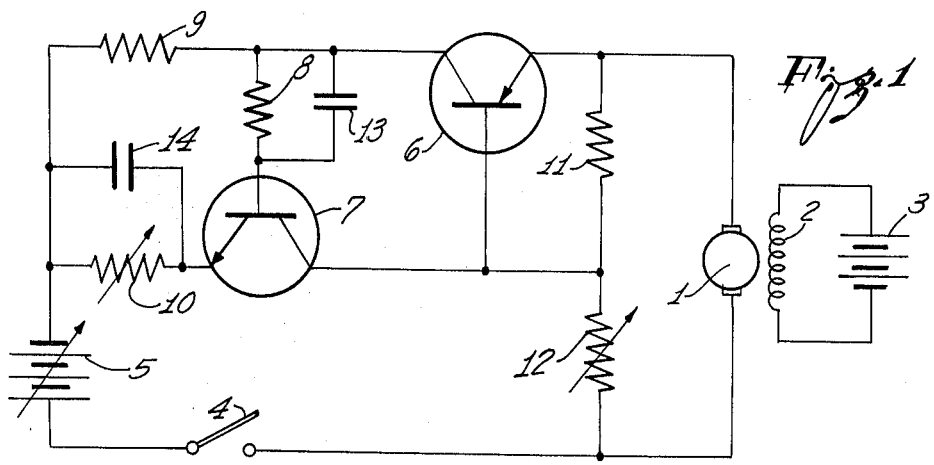
FIGURE 1 is a schematic circuit diagram illustrating one embodiment of the invention.

Referring to FIGURE 1, a conventional shunt motor has an armature 1 and a separately excited field winding 2. Constant excitation is supplied to field winding 2 by any suitable power supply 3. Since the field is constant, the induced voltage or back E.M.F. in armature 1 is proportional to the speed of the motor shaft. Hence, so long as the speed remains constant, the induced voltage or back E.M.F. will remain constant, and vice versa. However, the total voltage across the armature will not generally remain constant, because this voltage includes, in addition to the induced voltage or back E.M.F., the voltage drop across the equivalent resistance of the armature, a voltage drop which is proportional to the armature current. Since the torque delivered by the motor is proportional to the armature current, the armature current must vary directly with the load applied to the motor shaft. Consequently, as an increasing load is applied to the motor shaft, both the armature current and the voltage across the armature must increase to maintain a constant back E.M.F. and a constant shaft speed.

The motor armature 1 is connected in a series circuit loop comprising a switch 4, a voltage source 5, and a transistorized control circuit having a negative resistance characteristic. The control circuit comprises two junction transistors 6 and 7 connected as shown. Each transistor has the usual emitter, base and collector electrodes, as represented by conventional symbols in the drawings. By way of example, transistor 6 may be a type 2N174 PNP power transistor, and transistor 7 may be a type 2N95 NPN germanium transistor. It will be noted that the collector electrode of transistor 7 is connected directly to the base electrode of transistor 6, and that the base electrode of transistor 7 is connected to the collector electrode of transistor 6, preferably through a resistor 8 having a resistance of about 390 ohms. Both the transistors 6 and 7 may be considered as negative resistance elements since their resistances decrease with increases in current.

The emitter and collector electrodes of transistor 6 are connected in a series circuit loop with armature 1 and voltage source 5. As shown, the emitter electrode of transistor 6 is connected directly to armature 1, while the collector electrode of transistor 6 is connected to source 5 through a small series resistor 9 having a typical value of about 1 ohm. Since resistor 9 is a part of the series circuit including the motor armature, there is provided across resistor 9 a voltage proportional to the armature current.

An adjustable resistor 10 is connected as shown between the negative terminal of voltage source 5 and the emitter electrode of transistor 7. It will be noted that the base-emitter circuit of transistor 7 comprises resistors 8, 9 and 10 in series, whereby the aforesaid voltage drop across resistor 9 provides an input signal to transistor 7 and controls the currents conducted thereby, so that these currents, and in particular the collector current of transistor 7, vary directly with the armature current. Because the collector of transistor 7 is connected directly to the base of transistor 6, the base current of transistor 6 increases with each increase in the collector current of transistor 7, and consequently the conductivity of transistor 6 varies directly with the armature current. The ratio between the change in conductivity and the change in armature current can be adjusted by adjusting the circuit parameters, and in particular the resistance of resistor 10, to provide either a positive or a negative resistance of adjustable magnitude. In general, this ratio is decreased by increasing the resistance of resistor 10, which makes the loop circuit resistance more positive or less negative, and vice versa. Thus, the value of resistor 10 may vary greatly depending upon the operating conditions desired and the values of other circuit parameters.

Additionally, the speed of the motor can be controlled by supplying a control signal to the emitter-base circuit of transistor 6. As illustrated in the drawing, a resistor 11, typically about 470 ohms, is connected between the emitter electrode and the base electrode of transistor 6, and a resistor 12, typically several thousand ohms, is connected between the base electrode of the transistor 6 and the positive side of armature 1. The speed of the motor can be adjusted by adjusting various circuit parameters, particularly the resistance of resistor 12 or the voltage of source 5 or both. In a typical application employing a Bodine NSH–34 shunt motor, the voltage of source 5 is varied between 50 and 250 volts for adjusting the speed of the motor.

Resistor 10 is adjusted to provide across transistor 6 a negative resistance characteristic that approximately balances the positive resistances of armature 1, source 5, and resistor 9, so that the net resistance of the series loop circuit is approximately zero. With the circuit so adjusted, the speed of the motor remains substantially constant despite variations in the load applied to the motor shaft, and like variations of the armature current over a 10-fold range, e.g., from 50 milliamperes to 500 milliamperes. Because of their positive resistances, the voltage supplied by source 5 decreases and the voltage across armature 1 increases as the armature current increases. Both of these voltage changes are compensated by a decreasing voltage across transistor 6—for example, from about 30 volts to 50 milliamperes to about one-half volt at 500 milliamperes. It is this decrease in the voltage drop across transistor 6 as the current increases which supplies the required negative resistance to the circuit. In other words, as the current through the transistor 6 increases, the voltage across the transistor 6 decreases. This causes the transistor 6 so effectively to present a "negative resistance characteristic." It will be appreciated that the transistor 7 also has a "negative resistance characteristic" for similar reasons.

A very significant feature of the invention is the manner in which the transistor 6 is protected from excessive voltages and excessive power dissipation during start-up and periods of overload. This protection is due in part to the automatic operation herein described whereby the conductivity of transistor 6 is automatically increased and the voltage drop across the transistor 6 is decreased as the transistor current increases. Thus, at relatively high voltages across the transistor the current is small, and at relatively high currents the voltage is small, so that the power dissipation, equal to the product of the voltage and current, is never excessive during normal operation. However, additional protection is necessary under certain conditions, such as those encountered at start-up, and this will now be described.

Assume that the motor is stopped, and that switch 4 has just been closed to start the motor. At this instant there is no back E.M.F. in the motor armature, and a large portion of the supply voltage would appear across transistor 6, with a high probability of serious damage to the transistor, if protection were not provided by the circuit in the manner to be described. For this purpose, advantage is taken of a transistor characteristic; the Zener voltage of the collector-base junction. Assume, for example, that transistor 7 is a type 2N95 germanium transistor, as hereinbefore stated. In these transistors, the Zener voltage of the base-collector junction is between 30 and 50 volts, and whenever the collector is positive relative to the base by an amount greater than this Zener voltage, the base-collector junction becomes sufficiently conductive to limit the applied voltage substantially to the Zener voltage. Also, because the collector of transistor 7 is connected to the base of transistor 6, an increasing collector current of transistor 7 produces an increasing base current of transistor 6, which has the immediate effect of increasing the conductivity of transistor 6 and thus decreasing the voltage across transistor 6. This action limits the maximum voltage across transistor 6 approximately to the Zener voltage of the base-collector junction of transistor 7, and thereby prevents the application of excessive and damaging voltages to transistor 6.

On the other hand, transistor 7 is protected by the fact that transistor 6 becomes highly conductive as soon as any substantial current flows to the collector electrode of transistor 7, and thereafter a majority of the armature current passes through transistor 6 and not through transistor 7. Hence, the current through transistor 7 is always so small that there is little if any chance for the occurrence of conditions which might damage transistor 7.

In addition to the parts already described, a capacitor 13 may be provided in parallel with resistor 8, and a capacitor 14 may be provided parallel with resistor 10, as shown. Each of these capacitors may have a typical value of about 25 microfarads. The purpose of the two capacitors is to improve the high-frequency or transient response of the amplifier transistor 7, and thus to improve the regulation of the circuit with respect to voltage surges and rapidly varying armature currents.

Because typical germanium junction transistors, such as type 2N95, have base-collector junctions with Zener voltages that are often as low as 30 volts, the circuit illustrated in FIGURE 1 is limited to a control range of about a 30-volt variation in the voltage across transistor 6. For some applications, this is completely satisfactory; for other applications a greater control range, say 50 volts, is desired. In the latter case, the circuit illustrated in FIGURE 2 may be more advantageously employed.

Figure 2:
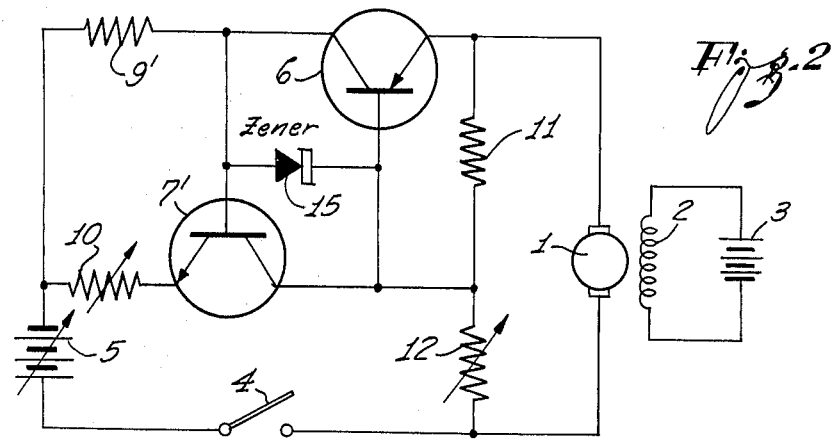
FIGURE 2 is a schematic circuit diagram illustrating another embodiment of the invention.

Referring now to FIGURE 2, parts that are identical to corresponding parts of the FIGURE 1 circuit are identified by the same reference numbers in both figures, and parts that are similar, but not identical, are identified by the same reference numbers with the addition of a prime (') to distinguish the parts employed in the FIGURE 2 circuit. In general, the FIGURE 2 circuit operates in a manner similar to the operation of the FIGURE 1 circuit, as hereinbefore described, with the exceptions that will now be explained. In the FIGURE 2 circuit, the transistor 7' is a silicon NPN junction transistor, such as type 2N332. In these transistors the Zener voltage of the base-collector junction is substantially in excess of 50 volts, and therefore the transistor 7' does not limit the voltage range that may be applied across the power transistor 6.

However, other means must now be found for protecting transistor 6 against excessive voltages during start-up and the like. In the FIGURE 2 circuit, this is accomplished by providing a 50-volt Zener diode 15 connected between the base and collector electrodes of transistor 6, as shown. Diode 15 becomes highly conductive whenever the base electrode of transistor 6 becomes about 50 volts positive relative to the collector electrode of the same transistor, and thereby effectively limits the maximum voltage that can be applied across transistor 6. Thus, in the FIGURE 2 circuit the Zener diode 15 performs substantially the same function as the Zener voltage characteristic of the base-collector junction of transistor 7 in the FIGURE 1 circuit, but with the advantage in the FIGURE 2 circuit of a somewhat higher and more definitely fixed Zener voltage.

It is evident that the use of different transistors in the FIGURE 1 and FIGURE 2 circuits may make it desirable to make certain adjustments in other circuit values. For example, in the FIGURE 2 circuit, it may be desirable to increase the resistance of series resistor 9' to a somewhat greater value, e.g., between 2 and 10 ohms.

Figure 3:
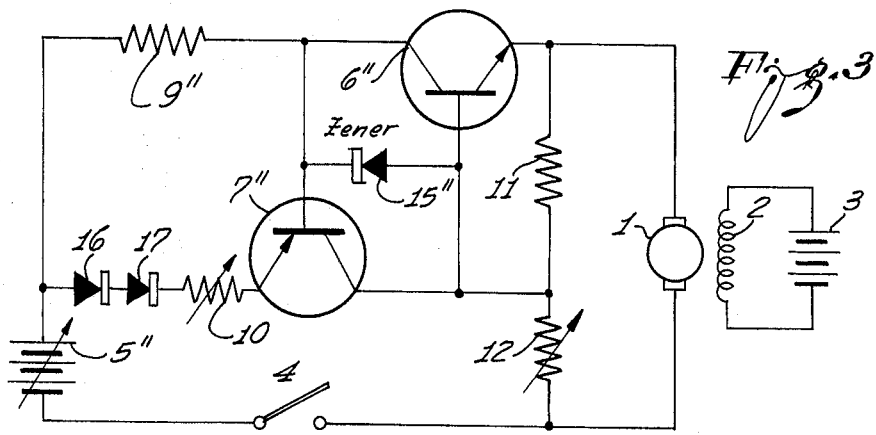
FIGURE 3 is a schematic circuit diagram illustrating still another embodiment of the invention.

Reference is now made to the circuit illustrated in FIGURE 3, which is generally similar to the circuit illustrated in FIGURE 2, except for the differences that will now be explained. In FIGURE 3, the parts that are identical to corresponding parts in the FIGURE 2 circuit are identified in each case by the same reference number, while parts that are similar, but not identical are identified by the same reference number with the addition of a double prime (") to distinguish the FIGURE 3 part.

In the FIGURE 3 circuit, the PNP transistor 6 of FIGURE 2 has been replaced by an NPN transistor 6", and the NPN transistor 7' has been replaced by a PNP transistor 7". Consistent with this change, the polarity of the power supply 5 has been reversed at 5", and the polarity of the Zener diode 15 has been reversed at 15". It is evident that these changes constitute a mere reversal of all polarities throughout the circuit, and have no effect upon the circuit operation except a reversal in the direction of current flow and a reversal of voltage polarities.

Another distinguishing feature of the FIGURE 3 circuit is the insertion of two silicon diodes 16 and 17 in series with resistor 10, as shown. Each of these silicon diodes is a non-linear impedance which presents a relatively high resistance to current flow until a voltage drop of about 0.7 volt in the forward direction is reached, after which the diode becomes a low impedance. The effect of these diodes is to keep transistor 7' in an essentially nonconductive state until the voltage drop across resistor 9" exceeds about 1.5 volts, and thereafter to permit operation of transistor 7" in the manner hereinbefore explained. The resistance of resistor 9" is so chosen, at about 1.5 ohms for example, that the voltage drop across resistor 9" is usually less than the 1.5 volts specified during normal running conditions of the shunt motor. Thus, during normal running conditions of the motor the circuit illustrated in FIGURE 2 operates essentially as though transistor 7" were not present, and the armature voltage is regulated in a conventional manner by transistor 6". However, during start-up and other exceptional conditions, when protection of transistor 6" is needed, the voltage across resistor 9" becomes greater than 1.5 volts, diodes 16 and 17 become small impedances, and transistor 7" operates to protect transistor 6" in the manner hereinbefore explained.

It should be understood that this invention is not limited to the specified examples herein illustrated and described. The scope of the invention is defined by the following claims.

I claim:

1. An electric current-control circuit, comprising first and second terminals between which the flow of electric current is to be controlled, first and second transistors each having emitter, base, and collector electrodes, one of said transistors being of the PNP type and the other being the NPN type, a first series resistor connected directly between said first terminal and the collector electrode of said first transistor, a direct circuit connection between the emitter electrode of said first transistor and said second terminal, a direct circuit connection between the base electrode of said first transistor and the collector electrode of said second transistor, a second series resistor connected directly between the emitter electrode of said second transistor and said first terminal, said first terminal and said first resistance and said collector electrode and base electrode of said first transistor and said collector electrode and said emitter electrode of said second transistor and said second resistor and said first terminal being connected in a series circuit to limit the voltage applied across the first transistor, circuit means connecting the base electrode of said second transistor to the collector electrode of said first transistor so that the voltage across the first series resistor controls the currents conducted by said second transistor, and connections for supplying a control signal between the emitter and base electrodes of said first transistor.

2. A regulated power supply, comprising a voltage source, first and second junction transistors each having emitter, base and collector electrodes, one of said transistors being of the PNP type and the other being of the NPN type, circuit means connecting the base electrode of each transistor to the collector electrode of the other, a resistor connected in series between said source and the collector electrode of said first transistor, circuit means connecting said source between said emitter and collector electrodes of said first transistor, circuit means connecting said resistor between the base and emitter electrodes of said second transistor and connecting said resistor in a circuit with the collector electrode and the base electrode of said first transistor and with the emitter electrode and the collector of said second transistor to limit the voltages across said first and second transistors, and circuit means for applying a control voltage between the base electrode and the emitter electrode of said first transistor.

3. An electric power supply for a shunt motor, comprising a voltage source, first and second transistors each having emitter, base and collector electrodes, one of said transistors being of the PNP type and the other being of the NPN type, a resistor, circuit means connecting the armature of said motor and said voltage source and said resistor and the collector and emitter electrodes of said first transistor together in a series circuit loop, said resistor being connected between said voltage source and the collector electrode of said first transistor, circuit means connecting the base electrode of each of said transistors to the collector electrode of the other, and circuit means connecting said resistor between the base electrode and the emitter electrode of said second transistor.

4. An electric power supply as defined in claim 3, wherein the collector electrode of said second transistor is connected directly to the base electrode of said first transistor, and a resistor is connected directly between the base electrode of said second transistor and the collector electrode of said first transistor.

5. An electric power supply as defined in claim 3, additionally comprising a Zener diode connected between the base and collector electrodes of said first transistor.

6. An electric power supply as defined in claim 3, additionally comprising a non-linear impedor connected in series with the emitter electrode of said second transistor.

7. A regulated power supply, including, a motor having an armature, a voltage source connected to the armature of the motor, a main current path for the armature of the motor including a first transistor coupled in a series arrangement with the armature of the motor and said source for controlling the voltage across the armature for changes in armature current, an auxiliary current path coupled across said transistor for controlling the voltage produced across said transistor in the series arrangement including the armature and said source during the time that the motor is being accelerated toward a particular speed, said auxiliary current path including means coupled to said transistor for increasing the current through said transistor to limit the voltage across said transistor during the time that the motor is being accelerated to the particular speed.

8. The regulated power supply set forth in claim 7 in which said auxillary current path includes a semi-conductor member having characteristics for providing a limited voltage and connected to the transistor to provide increased currents through the semi-conductor member and the transistor for limiting the voltage across the semi-conductor member and in which a resistor is connected in the main current path and in the auxiliary current path to apply across said semi-conductor member a voltage controlling the current through the member in accordance with the speed of the motor.

9. A control circuit, including, a direct current motor having an armature, a source of voltage coupled to the armature of the motor, a transistor for regulating the voltage across the armature of the motor, said transistor having base, collector and emitter electrodes and having characteristics for maintaining a safe operation for voltages less than a particular level between the emitter and collector electrodes of the transistor, means coupled to said emitter and said collector electrodes of said transistor for serially connecting said transistor with said source and the armature of the motor, and means coupled to said base electrode of said transistor and connected in an auxiliary circuit and responsive to variations of the armature current of the motor for adjusting the impedance presented by said transistor to the armature current, said adjusting means including a resistance element coupled between said base and said collector electrodes of said transistor and having a breakdown potential of a magnitude below a predetermined magnitude of collector-to-base potential across the transistor to limit the voltage across the transistor to the particular level and to provide increases in current through the transistor.

10. A control circuit for a direct current motor, including, a source of D.C. potential coupled to the armature of the motor, a transistor for controlling the voltage across the armature of the motor and having emitter, collector and base electrodes and having characteristics to maintain a safe operation only upon the occurrence of voltages between the emitter and collector electrodes within particular limits, means connecting said emitter and said collector electrodes in a series arrangement with said source and the armature of the motor, control means coupled to said base electrode of said transistor and responsive when the motor is started for increasing the current through said transistor to limit the magnitude of the potential between said collector electrode and said base electrode of said transistor within the particular limits, and circuit means coupled to said base electrode of said transistor for applying a control voltage to said base electrode of said transistor to control the speed of the motor and coupled to said control means to introduce a voltage to said control means in accordance with the speed of said motor for facilitating the operation of said control means in increasing the current through said transistor at low speeds of the motor.

11. A regulated power supply, including,
a variable impedance load,
a voltage source coupled to said load,
a first resistance element having negative resistance characteristics, the first resistance element being serially connected with said load and said source for regulating the voltage across said load, and
means coupled to said first resistance element and effective when the impedance presented by said load is below a predetermined value for obtaining an increase in the current through the first resistance element to limit the magnitude of the voltage across the first resistance element to protect the first resistance element.

12. The power supply set forth in claim 11 in which the protecting means includes a semi-conductor member having Zener characteristics for providing a limited voltage and for providing increased currents upon the introduction of voltages greater than the limited voltage and in which the first resistance element is connected to the semi-conductor member to receive the increased current through the semi-conductor member and in which a positive resistance element is connected in a circuit with the first resistance element and the load and the voltage source to produce increased voltages across the first resistance element and the resistance member with decreases in the value of the load.

References Cited by the Examiner
UNITED STATES PATENTS

| 2,751,549 | 6/1956 | Chase | 323—22 |
| 2,809,339 | 10/1957 | Guggi. | |
| 2,875,391 | 2/1959 | Brannan. | |
| 2,925,548 | 2/1960 | Scherer. | |
| 3,069,617 | 12/1962 | Mohler | 323—22 |

ORIS L. RADER, *Primary Examiner.*

MILTON O. HIRSHFIELD, *Examiner.*